United States Patent
Schleicher et al.

(10) Patent No.: US 6,641,930 B2
(45) Date of Patent: *Nov. 4, 2003

(54) ELECTRICALLY CONDUCTIVE METAL TAPE AND PLUG CONNECTOR

(75) Inventors: Klaus Schleicher, Stolberg (DE); Albert Rumbach, Aachen (DE); Jürgen Gebhardt, Osnabrück (DE); Udo Adler, Eschweiler (DE)

(73) Assignee: Stolberger Metallwerke GmbH & Co KG, Stolberg (DE)

( * ) Notice: Subject to any disclaimer, the term of this patent is extended or adjusted under 35 U.S.C. 154(b) by 71 days.

This patent is subject to a terminal disclaimer.

(21) Appl. No.: 09/859,825

(22) Filed: May 17, 2001

(65) Prior Publication Data

US 2002/0096662 A1 Jul. 25, 2002

(30) Foreign Application Priority Data

May 20, 2000 (DE) .......................... 100 25 107

(51) Int. Cl.$^7$ .......................... B32B 15/20; H01R 13/03
(52) U.S. Cl. ...................... 428/647; 428/929; 439/886; 439/887
(58) Field of Search ................................. 428/647, 929; 439/886, 887

(56) References Cited

U.S. PATENT DOCUMENTS

| 4,656,003 A | * | 4/1987 | Miyafuji et al. ............ 148/433 |
| 5,075,176 A | * | 12/1991 | Brinkmann .................. 428/646 |
| 5,766,776 A | * | 6/1998 | Buresch ....................... 420/557 |
| 5,833,920 A | * | 11/1998 | Nakanishi et al. ........... 420/473 |
| 5,849,424 A | * | 12/1998 | Sugawara et al. ........... 148/536 |
| 5,902,472 A | * | 5/1999 | Arai et al. .................. 106/1.25 |
| 5,938,862 A | * | 8/1999 | Yeh et al. .................... 148/400 |
| 5,957,364 A | * | 9/1999 | Socha ......................... 228/214 |
| 6,040,067 A | * | 3/2000 | Sugawara et al. ........... 428/336 |
| 6,336,979 B1 | * | 1/2002 | Sugawara et al. ........... 148/282 |
| 6,395,583 B1 | * | 5/2002 | Kubara et al. ............... 257/666 |
| 6,428,911 B2 | * | 8/2002 | Kitajima et al. ............. 228/208 |

FOREIGN PATENT DOCUMENTS

| DE | 44 43 461 | | 7/1996 |
| EP | 0 443 291 | | 6/1995 |
| JP | 63-105943 | * | 5/1988 |
| JP | 63-262448 | * | 10/1988 |
| JP | 7-18356 | * | 1/1995 |

* cited by examiner

*Primary Examiner*—John J. Zimmerman
(74) *Attorney, Agent, or Firm*—Kenyon & Kenyon

(57) ABSTRACT

An electrically conductive metal tape for manufacturing electrical contact components and a plug connector made of it. The metal tape has a base material made of copper or a copper alloy having a metallic coating, applied by molten technology, made of a tin-silver alloy containing a silver proportion between 1% and 3.8% by weight. The silver content in the coating preferably lies between 1.2% by weight and 2.5% by weight. Especially positive properties with respect to the adhesiveness between base material and metal coating are achieved by the silver proportion in the coating. At the same time, the temperature stability and sliding properties are improved. Furthermore, a stable contact resistance is ensured.

16 Claims, No Drawings

ELECTRICALLY CONDUCTIVE METAL TAPE AND PLUG CONNECTOR

BACKGROUND OF THE INVENTION

1. Field of the Invention

The present invention relates to an electrically conductive metal tape for manufacturing electrical contact components, as well as to a plug connector.

2. Description of Related Art

Plug connectors are used in electrotechnical applications. Basically understood, this is a mechanical device made up of a plug and plug socket for opening and closing an electrically conductive connection. Plug contact connections are used in the most varied application areas, for example in motor vehicle electrical equipment, information and communication technology or industrial plant electronics.

A common manufacturing method of such plug connectors is to punch out blanks from a copper or copper alloy tape, and to process these further into plug contacts. Copper has high electrical conductivity. To protect against corrosion and wear, as well as to raise surface hardness, the copper or copper alloy tapes are first tinned. Tin is suitable because of its good corrosion stability, especially as coating material for copper. Besides other coating methods, the application of the coating in a hot-dip method represents a technical standard.

In this connection, the most varied tin alloys are known for surface coating the base material, particularly including tin-silver alloys, since these count among the very good contact materials.

As described in European Patent No. 0 443 291, the base material of one plug contact element is coated with pure tin or a tin-lead alloy, while the other plug contact element has a harder surface coating, applied in a molten procedure, of an alloy containing up to 10% by weight of silver. Besides silver, several further alloying metals are suggested. This approach points the way on manufacturing high quality plug connectors having constant, low contact resistance and least possible force (required) for plugging and unplugging Another proposal according to German Patent No. 44 43 461 provides that a surface coating applied by a molten method contains a tin alloy, having up to 5% by weight of cobalt. Besides cobalt, the tin alloy can also contain bismuth and indium, as well as a plurality of additional alloying metals.

The known metal tapes, or rather, the plug connectors have proven themselves in practice. However, technical and qualitative requirements of the contact components are rising increasingly with respect to their mechanical and electrical properties. This applies particularly to the use of contact components in difficult or aggressive environmental conditions, for instance, for plug connectors in motor vehicle electrical equipment, and there, above all, in engine electronics. Under such difficult application conditions, requirements can come up, particularly with regard to temperature stability, relaxation stability, corrosion resistance and adhesive strength of the coating, in which the known contact components are pushed to their limit. Peeling-off of the surface coating was observed particularly with components stressed by shearing and being bent.

SUMMARY OF THE INVENTION

It is an the object of the invention to create an electrically conductive metal tape for manufacturing electrical contact components, particularly plug contact connectors, having improved adhesive properties between base material and metal coating while guaranteeing temperature stability and surface hardness, good sliding properties and stable contact resistance suitable for the requirements.

This and other objects of the invention are attained by an electrically conductive metal tape for manufacturing electrical contact components, in particular plug connectors, having a base material made of a copper or a copper alloy which has a metal coating, applied by molten technology, made of tin-silver alloy, an intermetallic phase being formed between the base material and the coating, wherein the coating is made of a tin-silver alloy having a silver proportion between 1% and 3.8% by weight. In a preferred embodiment, the invention is a plug connector made from the electrically conductive metal tape.

DETAILED DESCRIPTION OF THE INVENTION

Excellent adhesion between the base material and metal coating of the electrically conductive metal tape, not hitherto achieved, is applied using a coating of a tin-silver alloy having a silver proportion between 1% and 3.8% by weight. The surface hardness is increased by the addition of silver to the alloy. But simultaneously with this, the brittleness of the metal coating goes up, which basically would have a disadvantageous effect on the adhesiveness. Counter to this basic regularity, these contrary properties per se were successfully compensated by using a silver proportion between 1% and 3.8% by weight, preferably 1.2% to 2.5% by weight. At the same time, positive results with respect to temperature stability and the gliding properties can be achieved, and a stable contact resistance can be guaranteed.

If indium is also added to the tin-silver alloy, namely up to 10% by weight, but preferably between 0.1 and 5% by weight, it is true that the melting point is lowered, but on the whole, stability to outer conditions is improved. In addition, the soldering properties are positively influenced by this.

Advantageously, the base material is made of a copper-nickel-silicon alloy having nickel proportions between 1% and 4% by weight, as well as silicon proportions between 0.08% and 1% by weight. To this base alloy tin and zinc proportions up to 1.0% and 2.0% by weight, respectively, can be added. Adding further alloying metals to the alloy is also possible, whereby influence can be exerted on the mechanical properties of the metallic coating, as well as on the fine graininess and uniformity of the intermetallic phase, in accordance with each specific application of the metal tape.

Particularly positive results were achieved in tests with a base material as follows. Nickel in a proportion between 1.4% and 1.7% were addad to the copper alloy. The silicon proportion amounts to 0.2% to 0.35% by weight. Furthermore, tin and zinc are essential in weight per cent proportions between 0.02% to 0.3% by weight for tin, and 0.01% to 0.35% by weight for zinc.

The intermetallic phase between the base material and the coating is very fine-grained and even. From this derives a good formability, in particular bendability, higher resistance to shearing and lower moduli of elasticity, as well as high resistance to creep of the metal tapes according to the present invention.

Modifications to the base material are made by adding further alloying metals to the alloy. In this connection, adding silver works out particularly advantageously, and this in a proportion between 0.02% and 0.5% by weight, and preferably between 0.05% and 0.2% by weight. The alloy components zinc and silver influence the diffusion behavior in the intermetallic phase between the base material and the coating of tin-silver. The copper-tin phases, arising inevitably from diffusion of copper into the tin layer, are influenced in their development over temperature and time in the sense of a slowing down of, and interference with the formation especially of the so-called ϵ-phase. This guarantees a substantially better adhesion between the base material and the coating. This postpones detachment phenomena, or peeling of the coating even in unfavorable and difficult application conditions of the plug connectors made from the metal tape until higher temperatures and longer times are reached.

An important cause for a possible aging-related failure of the coating, particularly at temperatures above 1500 C, is a disproportionately fast conversion of the so-called η-phase ($Cu_6Sn_5$) into the ϵ-phase ($Cu_3Sn$) at the formation starting from the phase boundary between base material and coating, because of high diffusion speeds. The present invention now makes use of the realization that the presence of the ϵ-phase by itself does not necessarily lead to peeling processes at the boundary between the base material and the coating, not even in conjunction with a strain condition brought about by the forming process. If the development of the ϵ-phase is prevented or hindered, this has a positive effect on the intermetallic phase and long-term stability of the coating.

In the proportions provided by the present invention, zinc and silver, as well as the nickel present in the base material, are suitable for suppressing, or substantially slowing down the rapid transformation of the η-phase to the ϵ-phase, during the diffusion process and their participation in the formation of the intermetallic phase, especially through enrichment in the phase boundary, resulting in a homogeneous, highly adhesive bond between base material and coating.

The addition of zirconium up to 0.35% by weight, preferably in a proportion between 0.005% and 0.05% by weight, in addition to this, raises the corrosion stability and the temperature stability.

Magnesium increases the strength and the strain relaxation properties at raised temperature of the alloy, at only minor impairment of the electrical conductivity, which is based on the main component—copper. Magnesium dissolves in the copper matrix, and, is provided in the base material in a proportion up to 0.1% by weight. Furthermore, according to this, the base material may contain phosphorus in a proportion up to 0.05% by weight. The phosphorus acts as deoxidant, and, together with the magnesium, acts to increase the strength and the strain relaxation properties at increased temperatures. The phosphorus component also contributes to maintaining the spring strength of the metal tape during forming processes.

An improvement of the formability and also the hot rollability can be achieved by an iron proportion up to 0.1% by weight. The iron component also lessens the grain size during precipitation of the nickel and silicon compounds and resists the formation of cracks, which, in turn, is positive for the adhesive strength between base material and coating.

What is claimed is:

1. An electrically conductive metal tape for electrical contact components and plug connectors, comprising: a base material made of copper or a copper alloy having a metal coating made of tin-silver alloy, and an intermetallic phase between the base material and the coating; wherein the coating is made of a tin-silver alloy having a silver proportion between 1% and 3.8% by weight; wherein the base material includes:

| | |
|---|---|
| nickel (Ni) | 1.0% to 4.0% by weight |
| silicon (Si) | 0.08% to 1.0% by weight |
| tin (Sn) | 0.02% to 1.0% by weight |
| zinc (Zn) | 0.01% to 2.0% by weight | and the remainder being at least one additional alloy component which must include copper; and wherein a conversion of an η-phase ($Cu_6Sn_5$) into an ϵ-phase ($Cu_3Sn$) is hindered within the intermetallic phase.

2. The metal tape according to claim 1, wherein the silver content of the coating is from 1.2% by weight and 2.5% by weight.

3. The metal tape according to claim 1, wherein the tin-silver alloy contains up to 10% by weight indium.

4. The metal tape according to claim 1, wherein the tin-silver alloy contains between 0.1% and 5% by weight indium.

5. The metal tape according to claim 2, wherein the tin-silver alloy contains between 0.1% and 5% by weight indium.

6. The metal tape according to claim 1, wherein the base material includes:

| | |
|---|---|
| nickel (Ni) | 1.4% to 1.7% by weight |
| silicon (Si) | 0.2% to 0.35% by weight |
| tin (Sn) | 0.02% to 0.3% by weight |
| Zinc (Zn) | 0.01% to 0.35% by weight | and the remainder being at least one additional alloy component which must include copper.

7. The metal tape according to claim 2, wherein the base material includes:

| | |
|---|---|
| nickel (Ni) | 1.4% to 1.7% by weight |
| silicon (Si) | 0.2% to 0.35% by weight |
| tin (Sn) | 0.02% to 0.3% by weight |
| Zinc (Zn) | 0.01% to 0.35% by weight | and the remainder being at least one additional alloy component which must include copper.

8. The metal tape according to claim 1, wherein the base material further includes between 0.02% and 0.5% by weight silver (Ag).

9. The metal tape according to claim 2, wherein the base material further includes between 0.02% and 0.5% by weight silver (Ag).

10. The metal tape according to claim 4, wherein the base material further includes between 0.02% and 0.5% by weight silver (Ag).

11. The metal tape according to claim 6, wherein the base material further includes between 0.02% and 0.5% by weight silver (Ag).

12. The metal tape according to claim 8, wherein the base material contains between 0.05% and 0.2% by weight of silver (Ag).

13. The metal tape according to claim 1, wherein the base material further includes up to 0.35% by weight zirconium (Zr).

14. The metal tape according to claim 13, wherein the base material contains between 0.005% and 0.05% by weight of zirconium (Zr).

15. The metal tape according to claim 1, wherein the base material further includes up to 0.1% by weight of magnesium (Mg), up to 0.05% by weight of phosphorus (P) or up to 0.1% by weight of iron (Fe).

16. A plug connector made of a metal tape according to claim 1.

* * * * *